No. 859,722. PATENTED JULY 9, 1907.
H. E. ASBURY.
MEANS FOR ATTACHING LICENSE TAGS TO VEHICLES.
APPLICATION FILED NOV. 19, 1906.
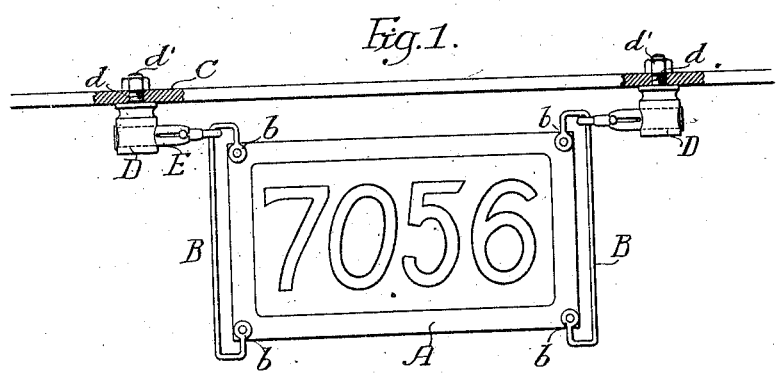
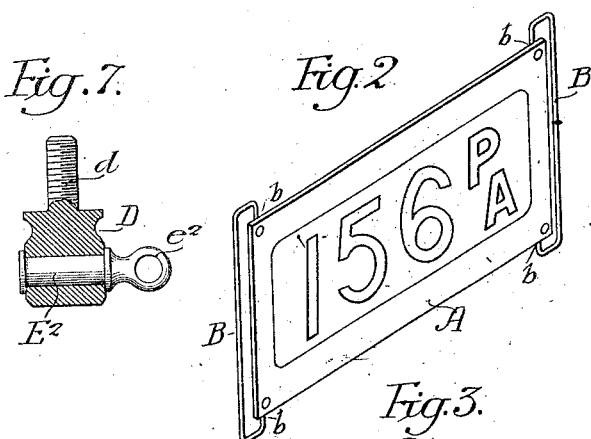
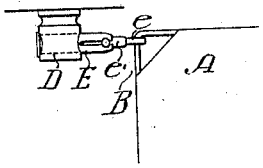
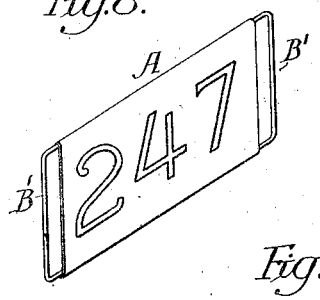
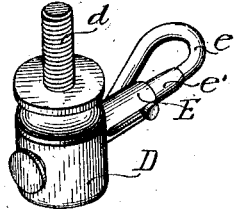
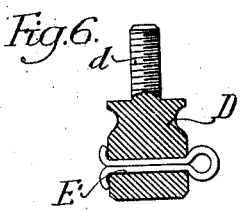
Witnesses:-
Augustus B. Coppes
Wills A. Burrowes
Inventor-
Harry E. Asbury.
by his Attorneys
Howson & Howson

UNITED STATES PATENT OFFICE.

HARRY E. ASBURY, OF PHILADELPHIA, PENNSYLVANIA.

MEANS FOR ATTACHING LICENSE-TAGS TO VEHICLES.

No. 859,722.

Specification of Letters Patent.

Patented July 9, 1907.

Application filed November 19, 1906. Serial No. 344,056.

*To all whom it may concern:*

Be it known that I, HARRY E. ASBURY, a citizen of the United States, residing in Philadelphia, Pennsylvania, have invented certain Improvements in Means for Attaching License-Tags to Vehicles, of which the following is a specification.

The object of my invention is to provide a simple and inexpensive device for attaching license tags to automobiles and other vehicles.

My invention can be readily applied to an automobile and the license tag can be turned to expose another number or detached to expose different license numbers if desired.

In the accompanying drawing:—Figure 1, is a front view illustrating my improved license tag holder secured to the body of an automobile; Fig. 2, is a perspective view of the license tag detached; Fig. 3, is a perspective view of one of the devices by which the tag is attached to a vehicle; Fig. 4, is a sectional view of the device shown in Fig. 3; Figs. 5, 6 and 7, are views of modifications of the attaching device; Fig. 8, is a perspective view of a modification of the tag, and Fig. 9, is a view of a further modification.

A is the license tag, quadrangular in shape in the present instance, and secured to each end of the tag is a rod B. These rods have eyes $b$ at each end through which pass rivets or other securing devices by which the rods are secured to the corners of the license tag. The attaching device consists of a block D having a screw threaded stem $d$ which extends through a plate C on the automobile or other vehicle to which the tag is to be applied; a nut $d'$ on the stem firmly secures the block to the vehicle. Swiveled in the block is a spindle E having, in the present instance as shown in Fig. 3, a snap-hook $e$, the hook being closed by a sliding spring bolt $e'$.

In attaching the tag to the vehicle all that is necessary is to space the attaching devices a given distance apart and secure them rigidly to the frame of the vehicle, then by withdrawing the bolts $e'$ the rods B can be mounted on the hooks, as illustrated in Fig. 1. The license tag will then hang freely from the hooks and display the number on one side of the tag. By swiveling the hooked spindle E as shown and by arranging the rods at each side of the tag two numbers can be used, one on one side of the tag and the other on the opposite side so that when an automobile is passing from one territory to another all that is necessary is to take the tag and lift the end, thereby sliding the rods through the hooked portions of the spindle and at the same time turning the tag and spindle, exposing the number previously at the back of the tag. By making the hooked spindles in the form illustrated a series of tags may be provided, each having the side rods, and one tag can be readily detached from the hooks and another substituted for it. In fact the hooks may be made as shown in Fig. 5, in which two or more tags may be mounted on the same hook, so that by shifting the tags and turning the hooks certain tags can be exposed while the others are covered by the exposed tag.

In Fig. 6, I have shown a modification in which a cotter pin $E'$ is used in place of the swiveled hook, and in Fig. 7, I have shown the swiveled spindle $E^2$ provided with an eye $e^2$, in place of the hook in this instance the rod will have to be so attached to the tag that one end can be detached to allow it to be passed through the eye.

In Fig. 8, I have shown a modified form of tag in which the tag is bound by a metallic frame $B'$ the frame being longer than the tag, so as to expose the side bars to allow the tag to travel on the securing devices when shifted.

In Fig. 9, I have shown a modification in which only the corners of the rod binding the tag are exposed to be engaged by the securing devices.

I claim:—

1. The combination in a license tag holder for vehicles of two attaching devices, a reversible tag, and means adjacent to the top and bottom of said tag for the reception of said attaching device, in either of the two positions of the tag, substantially as described.

2. The combination in a license tag holder for vehicles, of two attaching devices each having a swiveled spindle, with a reversible tag, and means adjacent to top and bottom of said tag for the reception of engaging means on said swiveled spindles when the tag is in either of its two positions, substantially as described.

3. The combination in a license tag holder, of a tag having a rod extending along each side, and attaching devices having swiveled spindles arranged to engage the rods of the tag at either end thereof to permit of the reversal of the tag, substantially as described.

4. The combination with a supporting structure having a tag holder, of a tag having rods at each side, blocks secured to the supporting structure, and spindles swiveled in the blocks and hooked to engage the rods of the tag, substantially as described.

5. The combination with a supporting structure having a tag holder, of a tag, a rod secured to each side of the tag, and blocks secured to the supporting structure, each having a swiveled hooked spindle arranged to engage the rods of the tag so that the tag can be reversed or detached, substantially as described.

6. The combination with a supporting structure having a tag holder, of a tag, a rod at each side of said tag, blocks secured to the supporting structure, swiveled spindles mounted in each block, hooks on the end of the spindles, and spring bolts closing the hooks so as to allow for the free shifting of the tag in the blocks at the same time allowing the tag to be detached, substantially as described.

7. The combination of a reversible tag having holding rods adjacent to its corners, with a supporting structure provided with two holding devices capable of being detachably secured to said rods to carry said tag with said devices engaging its holding rods adjacent to either of two opposite pairs of corners, substantially as described.

In testimony whereof, I have signed my name to this specification, in the presence of two subscribing witnesses.

HARRY E. ASBURY.

Witnesses:
 WILL. A. BARR,
 JOS. H. KLEIN.